(12) United States Patent
Thirugnanam et al.

(10) Patent No.: US 8,206,043 B2
(45) Date of Patent: Jun. 26, 2012

(54) FIBER OPTIC TRANSCEIVER MODULE RELEASE MECHANISM

(75) Inventors: Raja Maruthu Thirugnanam, Fremont, CA (US); Rob Golden, Discovery Bay, CA (US); Gioni Bianchini, Sunnyvale, CA (US)

(73) Assignee: Fourte Design & Development, LLC, Pleasanton, CA (US)

( * ) Notice: Subject to any disclaimer, the term of this patent is extended or adjusted under 35 U.S.C. 154(b) by 51 days.

(21) Appl. No.: 12/917,857

(22) Filed: Nov. 2, 2010

(65) Prior Publication Data

US 2012/0106902 A1     May 3, 2012

(51) Int. Cl.
*G02B 6/36*     (2006.01)
*H04B 10/00*     (2006.01)

(52) U.S. Cl. ................ 385/92; 385/53; 385/54; 385/55; 385/56; 385/57; 385/58; 385/59; 385/88; 385/89; 385/90; 385/91; 385/93; 385/94; 398/135; 398/136; 398/137; 398/138; 398/139

(58) Field of Classification Search .............. 385/53–59, 385/88–94; 398/135–139
See application file for complete search history.

(56) References Cited

U.S. PATENT DOCUMENTS

| | | | |
|---|---|---|---|
| 6,746,158 B2 | 6/2004 | Merrick | |
| 6,789,958 B2 * | 9/2004 | Ahrens et al. | 385/92 |
| 6,872,010 B1 * | 3/2005 | Bianchini | 385/92 |
| 7,513,693 B2 * | 4/2009 | Wang | 385/56 |
| 7,841,779 B1 * | 11/2010 | Bianchini et al. | 385/88 |
| 2003/0108300 A1 | 6/2003 | Walker et al. | |
| 2004/0033027 A1 | 2/2004 | Pang et al. | |
| 2007/0189673 A1 * | 8/2007 | Yoshikawa | 385/53 |

\* cited by examiner

*Primary Examiner* — Brian M. Healy
*Assistant Examiner* — Guy Anderson
(74) *Attorney, Agent, or Firm* — Carr & Ferrell LLP

(57) ABSTRACT

A fiber optic connector release mechanism is disclosed. The mechanism may be used to release a transceiver module housed in a cage that is permanently mounted on a printed circuit board. The release mechanism may include a cam mounted bail that rotates a U-shaped flange through a two stage travel path to urge the bail forward in a slide path on the transceiver module. As the bail begins to move forward, wedge elements at the end of a pair of slide arms extending rearward from the bail may contact locking tabs on the cage, forcing the locking tabs outward. As the locking tabs are forced outward, the shoulders of the transceiver module are released, and the transceiver module is free to slide out of the cage as the operator pulls on the bail.

20 Claims, 6 Drawing Sheets

FIBER OPTIC TRANSCEIVER MODULE RELEASE MECHANISM

BACKGROUND OF THE INVENTION

1. Field of the Invention

The present invention relates generally to electronic connector devices. More particularly, the present invention is a fiber optic transceiver release mechanism.

2. Background Art

Computers, related peripheral equipment, and satellite and communication systems have in the recent past evolved extremely rapidly. These systems require ever-increasing data transfer rates to perform the highly complex tasks that drive such processes as digital signal processing, image analysis, and communications. With current demands, optical couplers are used to transfer signals over short and long distances between computers, between two circuit boards in one computer, and even between multiple chips on a single printed circuit board. The use of high-speed optical signals in place of electrical interconnections increases the achievable data transfer rate.

An optical transmitter/receiver module typically includes both light-emitting devices, such as vertical cavity surface emitting lasers (VCSELs), and light-detecting devices such as photodiodes. Driver/receiver circuitry modules, typically in the form of application specific integrated circuit (ASIC) chips, include driver circuitry which receives electrical signals from one device and drives the VCSELs in response. The ASIC also includes receiver circuitry for receiving signals from the photodiodes and, in response, for processing those signals into an appropriate output. The combination of the VCSELs, the photodiodes, and the ASIC circuitry is commonly referred to as an optical transceiver.

As the density of the optical arrays increases, coupling a fiber optic cable to the arrays becomes an increasingly complex task. It is very important to align the active area of each emitter and detector with a corresponding fiber of the fiber optic bundle. The mechanical connection means therefore undergo a corresponding increase in importance. Fiber optic connectors are therefore of great interest in the current art. As such, improvements in the reliability and ease of manufacturing of such connectors are always welcome.

In the applications that are of interest in the present invention, local connector (LC) plugs are received in a pair of bays in a fiber optic transceiver module housed in a cage that is permanently mounted to a printed circuit board (PCB). It is imperative for data integrity that the connector means hold the LC plugs in position during data transmission or receiving. If the user wants to remove the transceiver module from the cage, it is equally important that the user be able to know whether or not the LC plugs are in use.

SUMMARY OF THE INVENTION

Exemplary embodiments of the present invention disclose a release mechanism for a transceiver module. The mechanism may include a bail rotatably mounted on the transceiver module. The bail may include a U-shaped flange that partially surrounds an arm assembly so that the bail does not tend to separate from the arm assembly or from the transceiver module. The arm assembly may have a main body nested in the bail, and may further include a pair of arms that extend rearward. The arms may include wedge elements at distal ends thereof, and the wedge elements may include an angled or arced surface.

The transceiver module may be constructed to be received in a cage adapted to be affixed to a printed circuit board. The cage may include locking tabs in opposing side panels that fit into openings of the transceiver module to secure the module in the cage.

To release the transceiver from the module, the bail may move in a two-stage travel path. First, the bail may rotate from a locked position through an approximately 45 degree arc without moving the transceiver module from an installed position as an axis pin moves in a slot in the arm assembly and the U-shaped flange moves through a first stage of an eccentric cam slot. The bail may then further rotate to move the U-shaped flange through a second stage of the eccentric cam slot. It should be noted that the bail may not be able to complete its rotation unless plug bays of the transceiver module are not occupied by plugs.

Other embodiments of the invention include methods of releasably securing a transceiver module in a cage. Such methods may include the following steps: forming a cage with locking tabs in opposing sides thereof, forming a transceiver module with openings therein to receive the locking tabs when the transceiver module is inserted into the cage, providing an arm assembly with a pair of arms extending rearward, a main body of the arm assembly being nested in a bail, rotatably mounting the bail on a front end of the transceiver module, the bail including a U-shaped flange that at least partially encloses inner and outer surfaces of the arm assembly, rotating the bail through an initial arc to release the bail from a locked position, and further rotating the bail to release the locking tabs from the openings.

DETAILED DESCRIPTION

Figure 1:
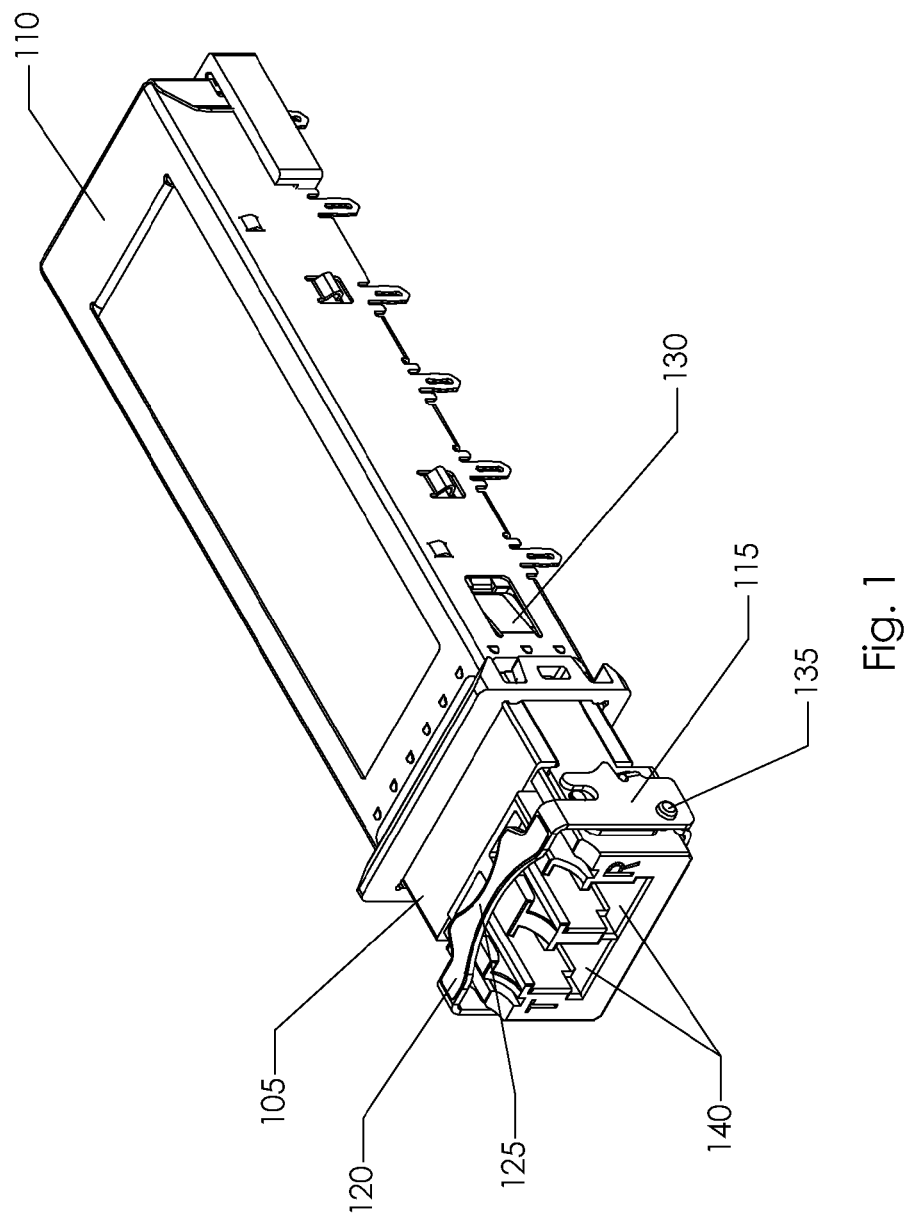
FIG. 1 is a perspective view of a transceiver module with a release mechanism according to an embodiment of the present invention, the transceiver module installed in a cage.

Exemplary embodiments of the present invention disclose a fiber optic transceiver release mechanism as illustrated in FIGS. 1-6. The release mechanism may be used on a transceiver module 105 that may be received in a cage 110 that is typically permanently mounted on a printed circuit board (not shown). The release mechanism may include a bail 115 with a handle 120. The handle 120 of the bail 115 may include a conveniently shaped finger plate 125 to provide a means for a user to easily grasp the handle 120.

The transceiver module 105 may be held in place in the cage 110 by a pair of locking tabs 130 formed as part of the side panels of the cage 110. The locking tabs 130 may protrude inward so as to contact the transceiver module 105 when the transceiver module 105 is inserted into the cage 110. The locking tabs 130 may be received in openings 205 defined in opposing sides of a transceiver module housing 210 when the transceiver module 105 is fully inserted into the cage 110.

As the transceiver module 105 is inserted into the cage 110, a flat segment 215 of the transceiver module housing 210 contacts the locking tabs 130, pushing the locking tabs 130 outward so that the transceiver module 105 can slide into the cage 110. When the transceiver module 105 is in the proper position in the cage 110, the locking tabs 130 rebound into the openings 205 on each side of the module housing 210. The transceiver module 105 therefore cannot be removed from the cage 110 until the locking tabs 130 are released.

Figure 5:
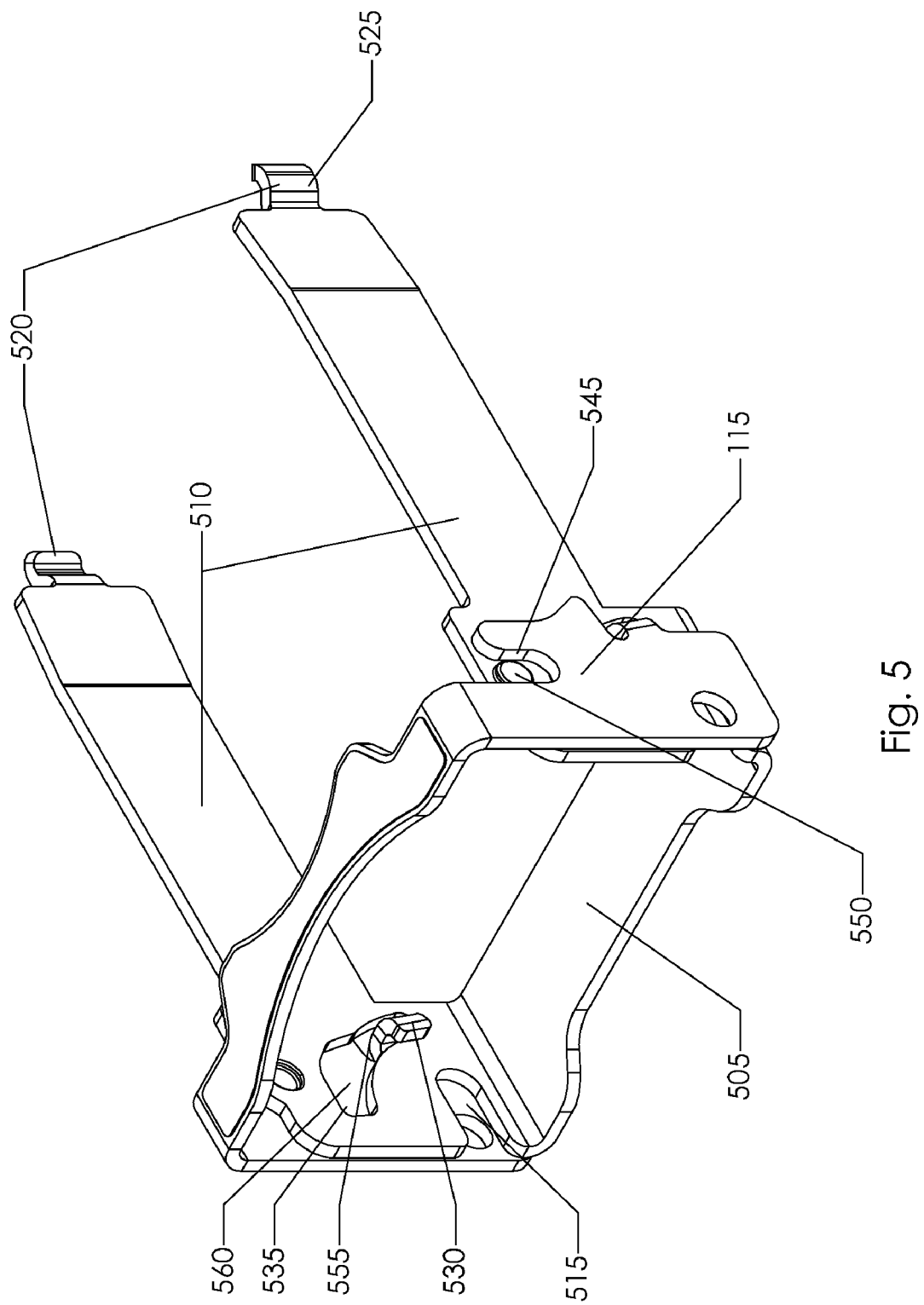
FIG. 5 is a perspective view of the bail and arm assembly.
Figure 6:
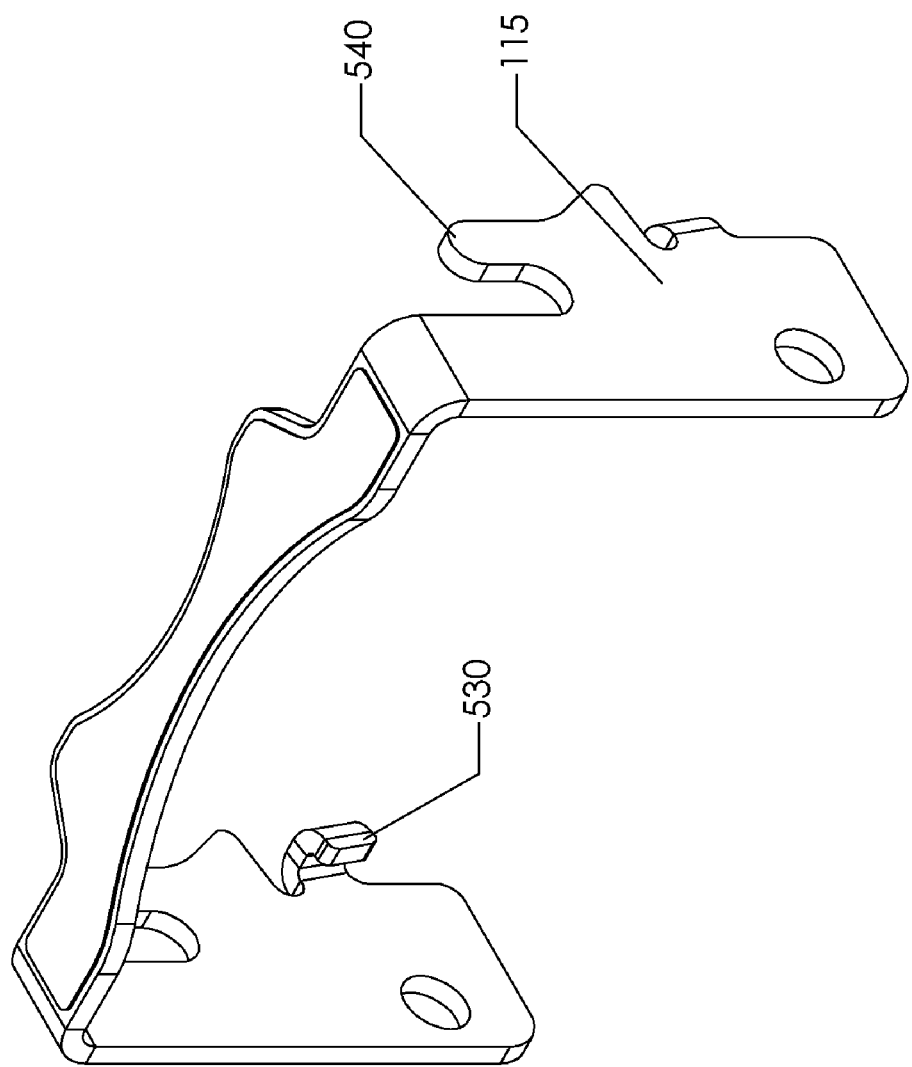
FIG. 6 is a perspective view of the bail.

FIG. 5 illustrates an embodiment of the structure of the bail 115 and an arm assembly 505. The bail 115 may be mounted on the module housing 210 with the arm assembly 505, which includes a pair of extended arms 510. The bail 115 may be rotatably attached to the transceiver module housing 210 with an axis pin 135 (see FIGS. 1 and 2) that passes through a slot 515 in the arm assembly 505.

At the rear ends of the arms 510 are wedge elements 520 that may each include an angled or arced surface 525. The angled or arced surface 525 allows the wedge elements 520 to move the locking tabs 130 from a locked position and out of the path of the transceiver module 105 in the cage 110 when the release mechanism is actuated. The wedge elements 520 and the arms 510 may at least partially define the openings 205 in the transceiver module 105.

The bail 115 may include a U-shaped flange 530 received in an eccentric cam slot 535 in the arm assembly 505. The U-shaped flange 530 may wrap around the arm assembly 505 (through the cam slot 535) so that the flange 530 contacts both inner and outer surfaces of the arm assembly 505. The U-shaped configuration of the flange 530, by enclosing the arm assembly 505, inhibits separation of the bail 115 from the arm assembly 505 and the transceiver module 105.

Figure 2:
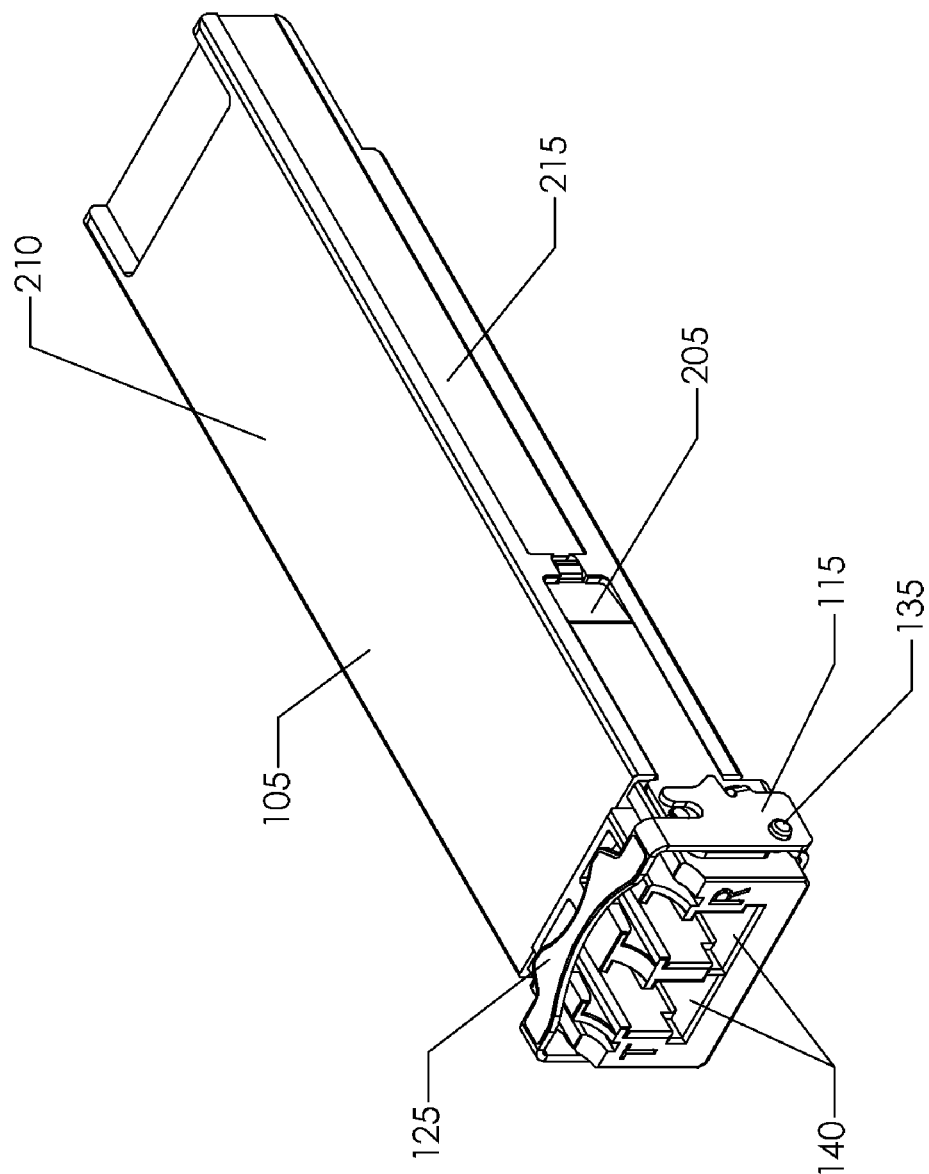
FIG. 2 is a perspective view of the transceiver module removed from the cage, and with the bail in its locked position.
Figure 3:
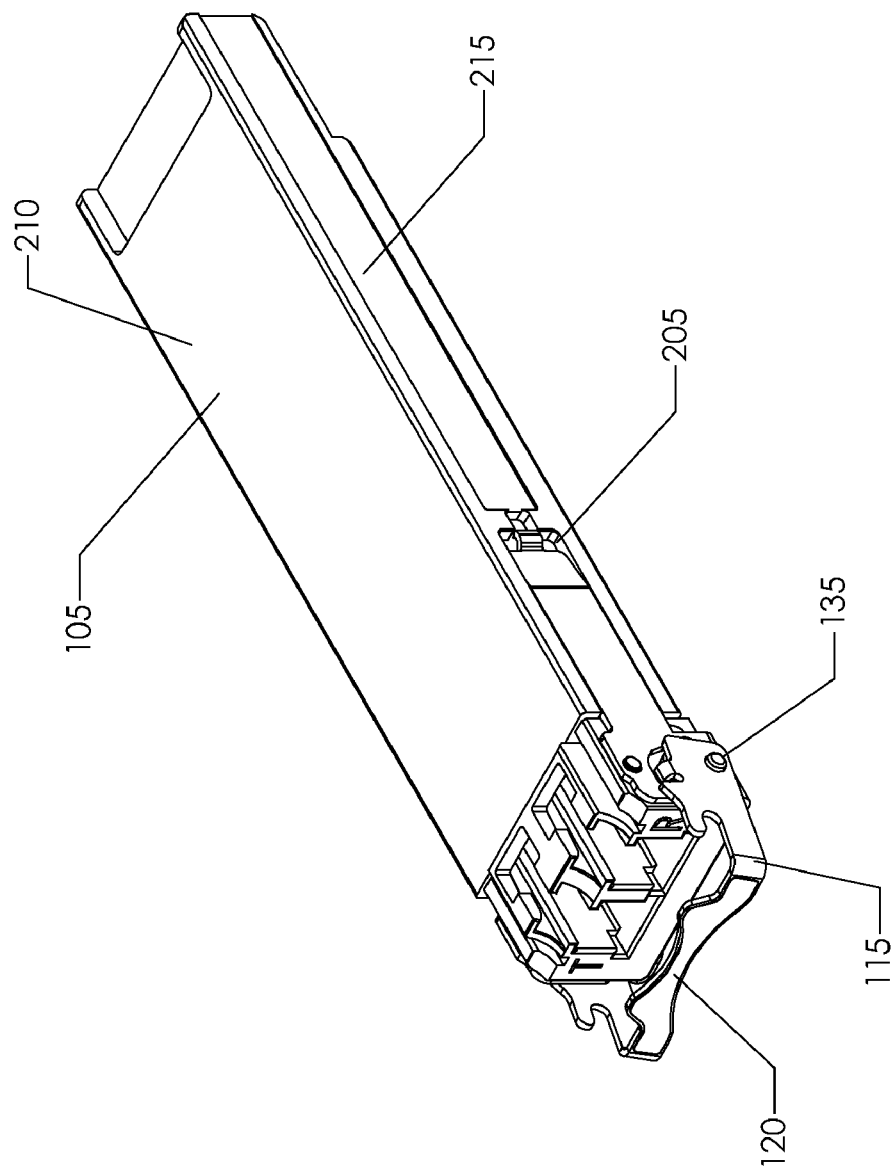
FIG. 3 is a perspective view of the transceiver module with the bail in its released position.
Figure 4:
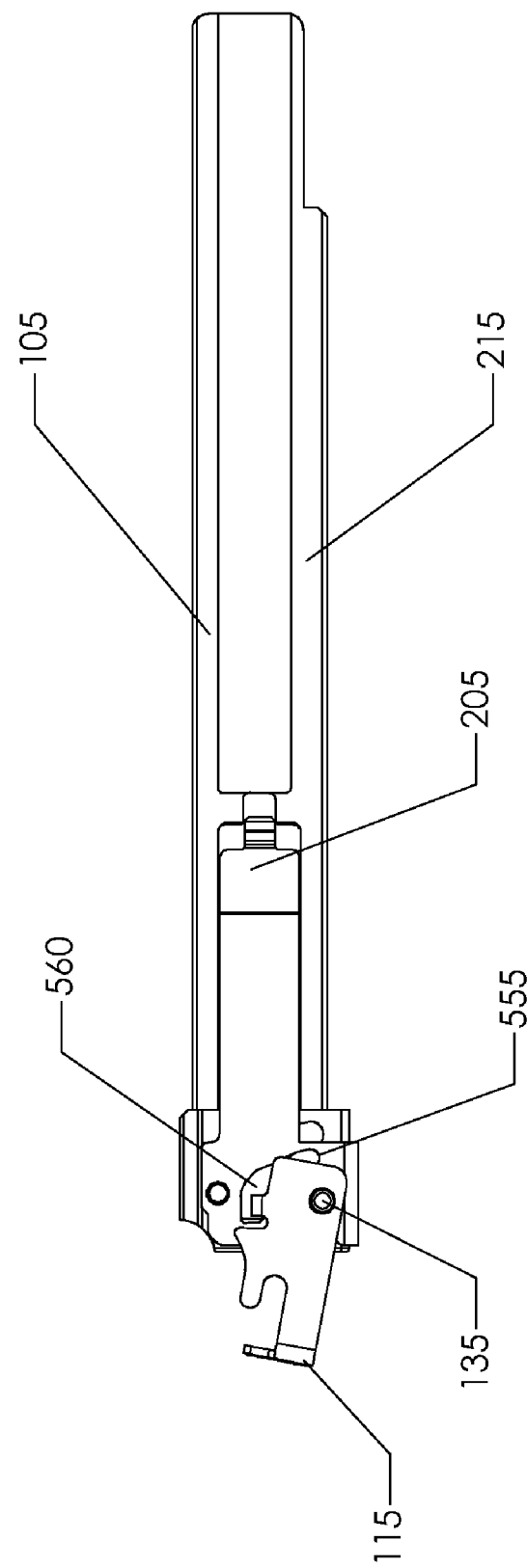
FIG. 4 is a side view of the transceiver module with the bail in its released position.

The bail 115 may be constructed with tabs 540 that extend from a rear portion of the sides of a main body of the bail 115 to define slots 545. Bosses 550 protruding from the transceiver module housing 210 may be received in the slots 545 to secure the bail 115 in a locked position as illustrated in FIGS. 1 and 2.

The bail 115 has a two-stage travel path during the release process. To initiate the release, a user uses the handle 120 to rotate the bail 115. As the bail 115 is rotated forward, the tabs 540 of the bail 115 are removed from the bosses 550 to release the bail 115 from its locked position. Flange 530 moves through a first stage 555 of the cam slot as the bail rotates through an arc of approximately 45 degrees.

As the bail 115 rotates past 45 degrees, the flange 530 moves into a second stage 560 of the cam slot. The flange 530 then contacts a front edge of the second stage 560 of the cam slot to pull the arm assembly 505 forward. As the arms 510 move forward with the arm assembly 505, the angled or arced surfaces 525 of the wedge elements 520 press against the locking tabs 130 of the cage 110. The forward motion of the wedge elements 520 urges the locking tabs 130 out of the interior of the cage 110. The arm assembly 505 may move forward until the rear edge of slot 515 contacts the axis pin 135. At this point, the arms 510 have been moved forward enough so that the angled or arced surfaces 525 of the wedge elements 520 have moved the locking tabs 130 clear of the interior of the transceiver module 105. The transceiver module 105 is therefore free to slide out of the cage 110 as the operator continues to pull on the bail 115. The bail 115 is now in the release position shown in FIGS. 3 and 4.

It should be noted that the bail 115 cannot complete the necessary rotation to release the transceiver module 105 unless any installed LC plugs (not shown) have been removed from plug bays 140 of the transceiver module 105. This feature provides a failsafe method for assuring that the transceiver module 105 cannot be removed from the cage 110 while the LC plugs are in position, thereby avoiding inadvertent data transmission interruption.

The embodiments described herein are illustrative of the present invention. As these embodiments of the present invention are described with reference to illustrations, various modifications or adaptations of the methods and or specific structures described may become apparent to those skilled in the art in light of the descriptions and illustrations herein. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A release mechanism for a transceiver module, the release mechanism comprising:
    a bail rotatably mounted on the transceiver module, the bail including a U-shaped flange;
    an arm assembly nested in the bail, the arm assembly including a pair of arms that extend rearward; and
    a cage to receive the transceiver module, the cage including locking tabs in opposing side panels thereof, the cage being adapted to be mounted on a printed circuit board; wherein the bail is rotatably mounted on the transceiver module by an axis that passes through a slot in the arm assembly, the U-shaped flange surrounds both an inner surface and an outer surface of the arm assembly, and the locking arms include elements that receive the locking tabs of the cage.

2. The release mechanism of claim 1, wherein the arms each include at a distal end thereof a wedge element that defines at least a portion of an opening that receives one of the locking tabs therein.

3. The release mechanism of claim 1, wherein the arms each include at a distal end thereof a wedge element that contacts one of the locking tabs and pushes the locking tab outward when the bail is moved forward.

4. The release mechanism of claim 3, wherein the wedge elements each comprise an angled or arced surface.

5. The release mechanism of claim 1, wherein the bail includes a tab projecting from a main portion of the bail, the tab defining a slot that receives a boss projecting from a handle so as to secure the bail in a locked position.

6. The release mechanism of claim 1, wherein the bail moves in a two-stage travel path, the bail rotating from a locked position through an approximately 45 degree arc without moving the transceiver module from an installed position as the axis pin moves in the slot and the U-shaped flange moves through a first stage of an eccentric cam slot, the bail further rotating to move the U-shaped flange through a second stage of the eccentric cam slot.

7. The release mechanism of claim 1, wherein the transceiver module remains in an installed position as the bail moves from a locked position through an approximately 45 degree arc, and the bail is not able to complete the 45 degree arc unless plug bays of the transceiver module are not occupied by plugs.

8. A release mechanism for a transceiver module, the release mechanism comprising:
    a bail rotatably mounted on the transceiver module, the bail including a U-shaped flange;
    an arm assembly nested in the bail, the arm assembly including a pair of arms that extend rearward; and
    a cage that receives the transceiver module, the cage including locking tabs in opposing side panels thereof, the cage being adapted to be mounted on a printed circuit board; wherein the bail is rotatably mounted on the transceiver module by an axis that passes through a slot in the arm assembly, the U-shaped flange surrounds both an inner surface and an outer surface of the arm assembly, and the locking arms include at distal ends thereof a wedge element; such that when the release mechanism is in a locked position, the handle is in a rearmost position in the slide path, and the at least one locking tab protrudes into the slide path so as to secure the transceiver module, and when the bail is rotated to a released position, the handle moves to a forward position in the slide path, causing the wedge elements to push against the at least one locking tab so as to move the at least one locking tab out of the slide path, thereby releasing the transceiver module from the cage.

9. The release mechanism of claim 8, wherein the wedge elements each comprise an angled or arced surface.

10. The release mechanism of claim 8, wherein the bail includes a tab projecting from a main portion of the bail, the tab defining a slot that receives a boss projecting from the handle so as to secure the bail in a locked position.

11. The release mechanism of claim 8, wherein the bail moves in a two stage travel path, the bail rotating from a locked position through an approximately 45 degree arc without moving the transceiver module from an installed position as the axis pin moves in the slot and the U-shaped flange moves through a first stage of an eccentric cam slot, the bail further rotating to move the U-shaped flange through a second stage of the eccentric cam slot.

12. The release mechanism of claim 8, wherein the transceiver module remains in an installed position as the bail moves from a locked position through an approximately 45 degree arc, and the bail is not able to complete the 45 degree arc unless plug bays of the transceiver module are not occupied by plugs.

13. A method of releasably securing a transceiver module in a cage, the method comprising the following steps:
forming a cage with locking tabs in opposing sides thereof;
forming a transceiver module with openings therein to receive the locking tabs when the transceiver module is inserted into the cage;
providing an arm assembly with a pair of arms extending rearward, a main body of the arm assembly being nested in a bail;
rotatably mounting the bail on a front end of the transceiver module, the bail including a U-shaped flange that at least partially encloses inner and outer surfaces of the arm assembly;
rotating the bail through an initial arc to release the bail from a locked position; and
further rotating the bail to release the locking tabs from the openings.

14. The method of claim 13, wherein providing an arm assembly further includes providing at a distal end of each arm a wedge element that defines at least a portion of an opening that receives one of the locking tabs therein.

15. The method of claim 13, wherein further rotating the bail causes a wedge element at a distal end of each arm to contact one of the locking tabs so that the locking tab is pushed outward, thereby releasing the transceiver module.

16. The method of claim 14, wherein the wedge elements each comprise an angled or arced surface.

17. The method of claim 15, wherein the wedge elements each comprise an angled or arced surface.

18. The method of claim 13, wherein the bail includes a tab projecting from a main portion of the bail, the tab defining a slot that receives a boss projecting from a handle so as to secure the bail in a locked position.

19. The method of claim 13, wherein rotating the bail moves the bail from a locked position through an approximately 45 degree arc without moving the transceiver module from an installed position as the axis pin moves in the slot and the U-shaped flange moves through a first stage of an eccentric cam slot, and further rotating the bail further rotating to move the U-shaped flange through a second stage of the eccentric cam slot.

20. The method of claim 13, wherein the bail is not able to complete both rotation steps unless plug bays of the transceiver module are not occupied by plugs.

* * * * *